UNITED STATES PATENT OFFICE.

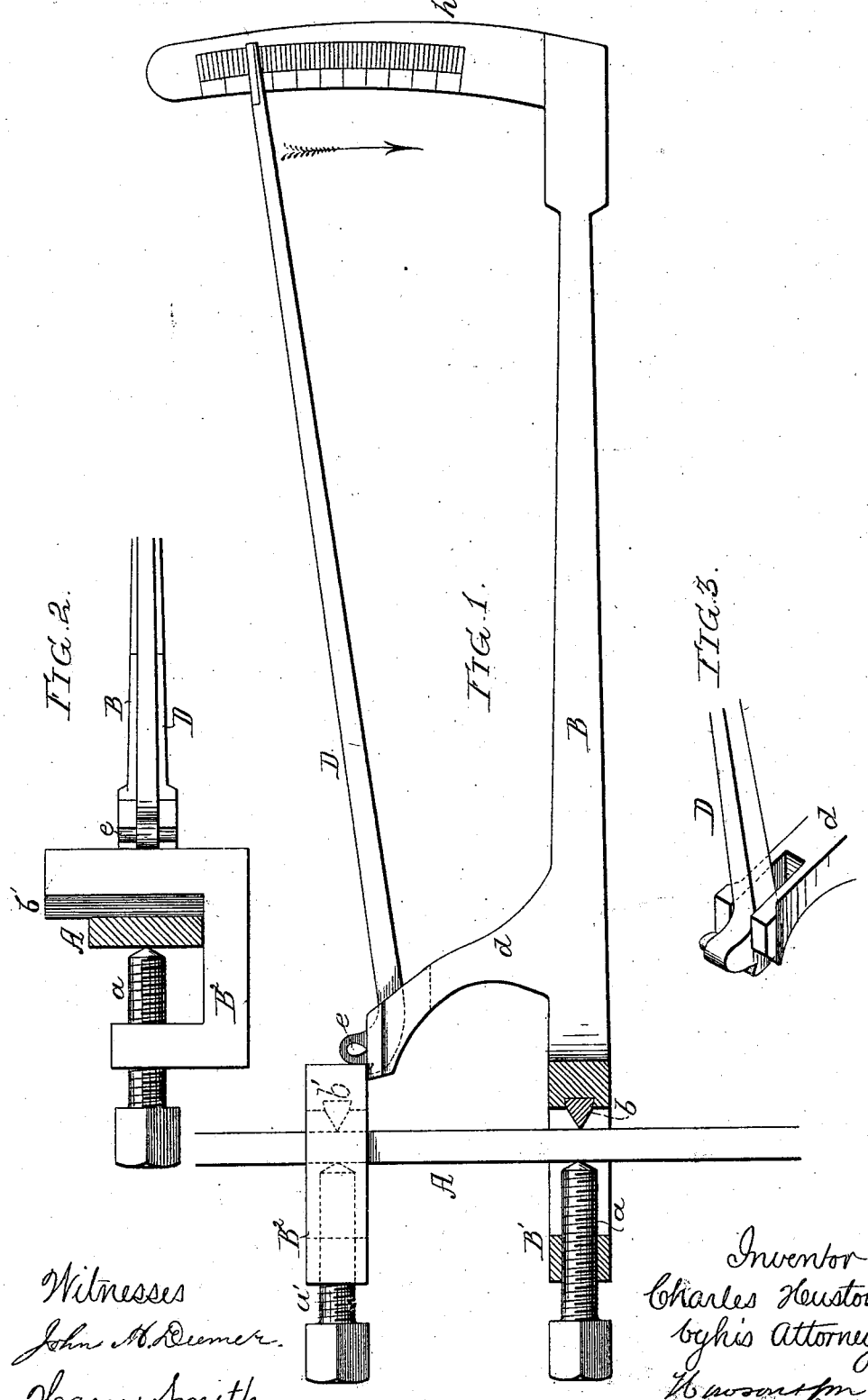

CHARLES HUSTON, OF COATESVILLE, PENNSYLVANIA, ASSIGNOR TO E. AND T. FAIRBANKS & CO., OF ST. JOHNSBURY, VERMONT.

IMPROVEMENT IN DEVICES FOR INDICATING THE YIELDING OF A ROD OR BAR UNDER TENSION.

Specification forming part of Letters Patent No. 209,893, dated November 12, 1878; application filed July 1, 1878.

*To all whom it may concern:*

Be it known that I, CHARLES HUSTON, of Coatesville, Pennsylvania, have invented a new and useful Improvement in Devices for Indicating the Yielding of a Rod or Bar under Tension, of which the following is a specification:

The object of my invention is to make a device for indicating the extent to which a bar or rod will yield under tension before or at the time it is torn apart; also, for indicating the extent of its resiliency after being stretched; and this object I attain in the following manner, reference being had to the accompanying drawing, in which—

Figure 1 is a side view, partly in section, of the indicator; Fig. 2, a plan view, and Fig. 3 a perspective view of one end of the indicating-lever.

A is the bar or rod to be tested, and is supposed to be applied to a machine for determining its tensile strength, the rod being in a vertical position.

When a tensile strain is imparted by the testing-machine to the bar A, the latter must necessarily be stretched and elongated, and the distance between the two clamping-frames B and B¹ gradually increased, and consequently the long arm or pointer of the lever must descend, and, in connection with the scale on the segment $h$, must point out the extent to which so much of the bar as is contained between the two clamping-frames is stretched. By watching the indicator (with which every testing-machine is furnished) for exhibiting the amount of tensile strain imparted to the bar, and at the same time noting the pointer of my improved indicator, which is attached to the bar, the observer can ascertain how much a given length of the bar—that is, the portion between the two clamps—will stretch under a given tension. The bar also passes through a slotted clamp, B², which is secured to the bar by and between a set-screw, $a'$, and knife-edged projection $b'$.

A projection, $d$, forming in the present instance part of the arm B, determines the distance between the knife-edged projection $b$ of the clamping portion B¹ of the arm B and the knife-edged projection $b'$ of the clamp B², the latter being so adjusted as to bear against the end of the projection $d$, which is slotted to receive the inner end of the lever D. This lever is provided with knife-edges $e$, for bearing on the projection $d$, the short arm of the lever being slightly turned up at the end, as best observed in Fig. 3, so as to present a sharp edge for bearing against the under side of the clamp B², and the long arm serving as a pointer, which, in conjunction with a properly graduated and figured scale on a segment, $h$, on the end of the arm B, indicates the extent to which a given length of the bar A will yield under tension, the given length of the bar being that between the knife-edged projections $b$ and $b'$ of the slotted clamping-frames B¹ and B².

As the bar A yields under tension, the long arm of the lever D will descend, and if the indicator of the testing-machine, as well as the pointer and scale, be watched, the observer can determine how much the given length of the bar A stretches under a given tension. The extent of the resiliency of the bar after the tensile strain has been removed can also be determined by noting the pointer and scale.

It will be understood that the graduations on the scale represent fractions of an inch, and that these graduations may be determined by the difference between the length of the short arm and that of the long arm of the lever.

In some cases the arm B and the long arm of the lever D may be bent upward, so that the scale may be arranged horizontally, or nearly so, and a rod, as shown by dotted lines, may extend from the clamp B¹ to and through an opening in the clamp B², so as to insure the parallelism of the two clamps.

I claim as my invention—

The within-described indicating device, consisting, essentially, of two clamps adapted to the rod or bar to be tested, in combination with a lever adapted to the said clamps, and a graduated scale carried by one of the clamps, and serving with the lever to determine the extent to which that portion of the bar between the clamps will be stretched under tension, all substantially as set forth.

In testimony whereof I have signed my name to this specification in the presence of two subscribing witnesses.

CHAS. HUSTON.

Witnesses:
JAMES W. GRANT,
HARRY SMITH.